Aug. 26, 1924.
C. E. WADE
METAL WHEEL
Filed Oct. 7, 1921
1,506,098
2 Sheets-Sheet 1
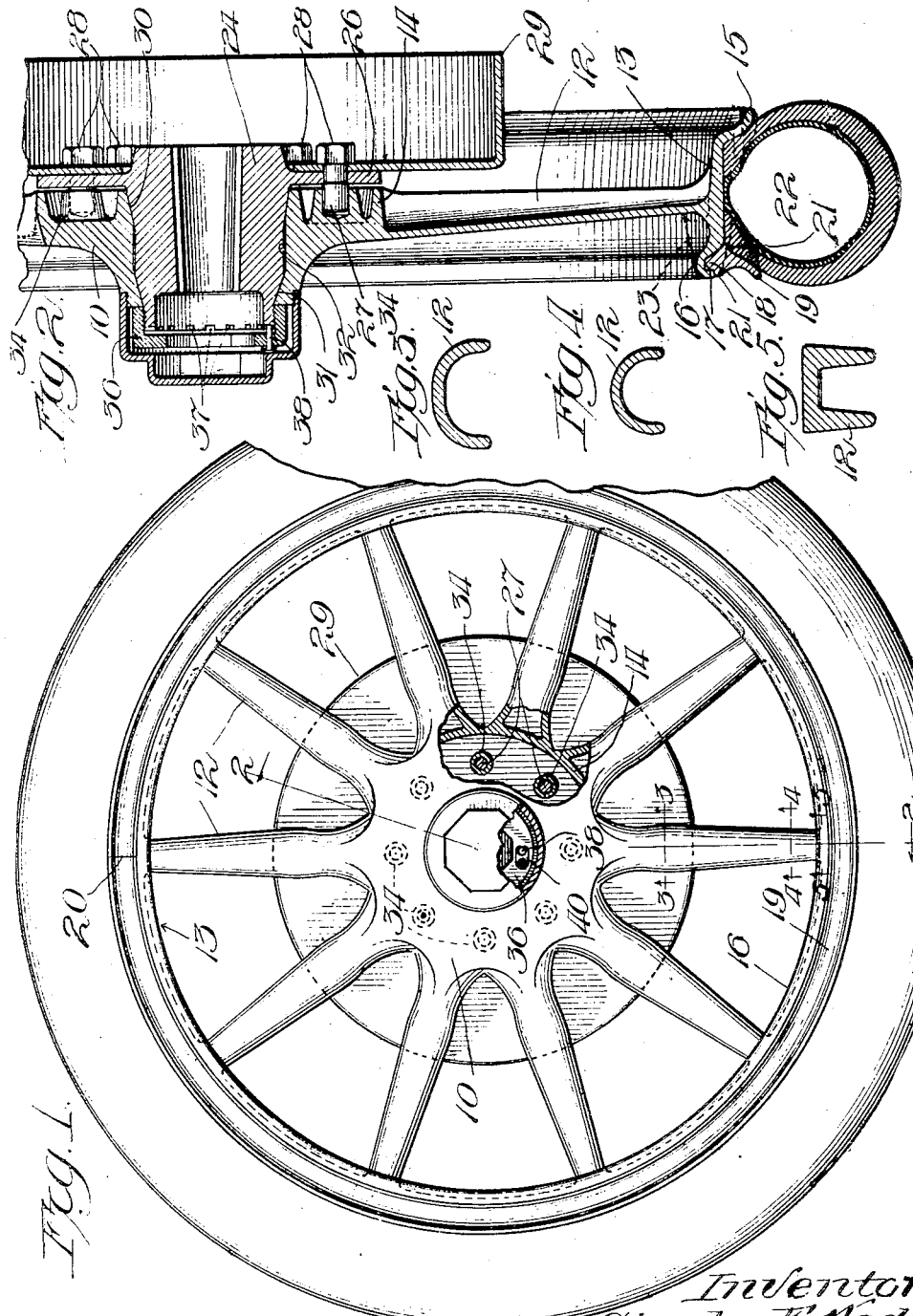
Inventor:
Charles E. Wade,
by Rector, Hibben, Davis and Macauley
Attys

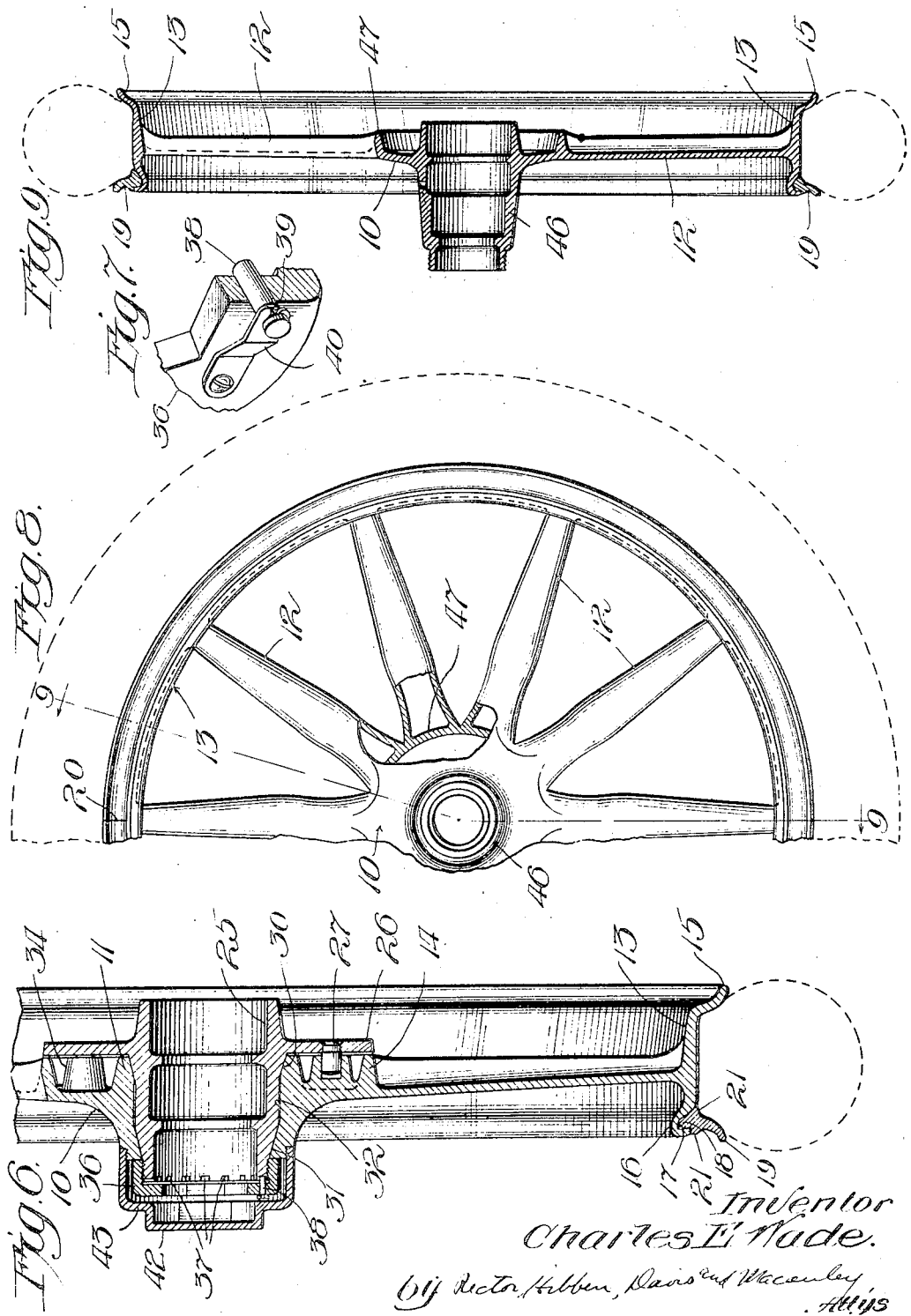

Patented Aug. 26, 1924.

1,506,098

UNITED STATES PATENT OFFICE.

CHARLES E. WADE, OF DETROIT, MICHIGAN, ASSIGNOR TO JEFFERSON FORGE PRODUCTS COMPANY, OF DETROIT, MICHIGAN, A CORPORATION OF MICHIGAN.

METAL WHEEL.

Application filed October 7, 1921. Serial No. 506,033.

*To all whom it may concern:*

Be it known that I, CHARLES E. WADE, a citizen of the United States, residing at Detroit, in the county of Wayne and State of Michigan, have invented certain new and useful Improvements in Metal Wheels, of which the following is a specification.

My invention relates to metal wheels for automobiles and has for its general object to provide in a forged metal wheel a tire rim integrally mounted on the ends of the spokes and adapted to receive and support a tire mounted directly thereon, thus eliminating the use of the usual felloe, demountable rim and rim securing devices. The application of a tire rim directly to ends of the spokes in such an integral forging offers and combines the advantages, among others, of lightness of weight, great strength, reduction of the number of parts, minimum cost of manufacture, elimination of noise caused by friction between the usual rim, felloe, and rim retaining devices, perfect alignment of the tire on the wheel and ease of application of the tire to the rim.

Another object of my invention is to provide the wheels, forged as stated above, with integral hubs so that the wheels may be interchangeably and with equal facility mounted on the permanent or inner hubs on both the rear and front axles of automobiles.

With the above and incidental objects in view the invention consists in certain novel features of construction and arrangement and new combinations of parts the elements of which are more particularly recited and pointed out in the appended claims; and in the accompanying drawings the invention is illustrated in the preferred form of embodiment hereafter described in detail.

In the drawings, Fig. 1 is a side elevation, with parts broken away, showing a wheel embodying my invention and mounted on a permanent or inner hub adapted to be mounted on the rear axle of an automobile; Fig. 2 is a section on a line 2—2 of Fig. 1; Figs. 3, 4, and 5 are spoke sections on the lines 3—3, 4—4, and 5—5 of Fig. 1; Fig. 6 is a section, generally similar to Fig. 2, showing the wheel mounted on a permanent or inner hub adapted to be mounted on the front axle of an automobile; Fig. 7 is a detail perspective view showing the latch carried by the lock nut; Fig. 8 is a partial side elevation of a wheel, embodying a modified form of my invention, the hub which is adapted to be supported directly on bearings on the front axle, being integral with the wheel, and Fig. 9 is a section taken on the line 9—9 of Fig. 8.

Throughout the drawings like numerals of reference refer to like parts.

The wheel, shown in Figs. 1, 2, and 6, comprises in an integral forged structure a center body 10, somewhat disk-shaped in formation, an outer wheel hub 11, into which the center body merges, spokes 12 and a tire rim 13. The outer ends of the spokes are integral with and merge into the tire rim 13 while the inner ends spring from and are integral with the center body 10. The spokes, which are preferably arranged in slightly dished formation, are of channeled or pari-tubular section, as best shown in Figs. 3, 4, and 5, and the inner ends of the sides of the channeled portions unite or merge with a circular flange 14 integral with and projecting inwardly from the center body 10 adjacent the roots of the spokes.

The rim is integrally provided on one side with a continuous and outwardly extending flange 15 which is curved in section. On the other side of the spokes the rim is provided with an inwardly extending flange 16 having a continuous groove 17 opening outwardly and in which is adapted to seat an annular portion 18 of a detachable tire retaining flange 19, which is curved outwardly and oppositely to the flange 15. The detachable flange 19 is split at 20 (Fig. 1) to permit removal of the flange from the groove 17 and hence the removal or detachment of the tire from the rim for the purpose of repair or replacement of the tire. The sides of the groove 17 are inclined at an angle to the plane of the wheel and the detachable flange 19 is provided with the annular shoulders 21 co-operating with the rim, the inclination of the groove and the shoulders serving to retain firmly the detachable flange in position on the rim when the tire is inflated. It will be observed that the rim tapers (in cross section) in both directions from its center longitudinal line so that the rim is thickest at the center and thinnest at its edges, thus obtaining the greatest strength where required while at the same time making the rim comparatively light in weight.

The shape of the rim of the wheel when the latter is removed from the forging dies is illustrated by the dotted lines 22 and 23 in Fig. 2, it being seen from this figure that the outer surface of the rim is then conical and that the inner surface to the left of the spokes (as viewed in Fig. 2) is also conical but inclines in the opposite direction, the rim being later machined to make its outer periphery cylindrical and properly to shape and form the flanges 15 and 16 and the groove 17.

In Figs. 1 and 2 I have illustrated the wheel as being mounted on an inner or permanent hub 24 adapted to be mounted on and driven by the rear or driving axle of an automobile, and in Fig. 6 I have shown the wheel mounted on a permanent or inner hub 25 adapted to be supported directly on the wheel bearings on the front axle of the automobile, it being understood that the wheel is adapted to be interchangeably mounted on either the front or rear permanent hub as desired or as the occasion may require. Each hub 24 and 25 is provided with an integral flange 26 carrying equally spaced driving studs or pins 27 which have enlarged ends projecting outwardly from the flange. The studs 27 on the front hub 25 are riveted to the flange 26 and the studs 27 on the rear hub 24 are secured thereto by nuts 28, the studs 27 for the rear hub being also adapted to support a brake drum 29 on the hub. Each hub 24 and 25 is also provided with two conical surfaces 30 and 31 connected by a cylindrical surface or portion 32, the inner periphery of the hub 11 of the wheel being provided with complemental surfaces or portions. Projecting inwardly from the center body 10 of the wheel and equally spaced thereon and in the same relation as the studs 27 are spaced are inwardly projecting bosses 34 into which the ends of the driving studs 27 project when the wheel is mounted on the inner hub 24 or 25. The cylindrical ends of the hubs 24 and 25 beyond the conical surfaces 31 are screw threaded to receive a nut 36 having an octagonal center for reception of a hand wrench. The outer ends of the hubs 24 and 25 are provided with a series of notches 37 into which a lock pin 38 is adapted to engage (Figs. 1, 6 and 7). The lock pin 38 is slidably mounted in an aperture in the lock nut 36 and the lock pin is provided with a groove 39 into which the free bifurcated end of a leaf spring 40 engages. The other end of the spring leaf is secured to the nut 36 by a screw and the spring normally tends to move the pin 38 outwardly in which position the inner end of the latter is within the aperture in the nut or in other words does not project laterally from the side of the nut. A dust cap 42 is screwed on the hub 11 of the wheel, the forward end of the hub being slightly reduced and screw threaded, the reduction being just sufficient to cause the outer periphery of the dust cap to be flush with the outer surface of the hub 11 adjacent the reduced portion.

From the above description it will be clear that the wheel may be mounted on either a front or rear permanent or inner hub. In mounting the wheel upon one of these hubs the wheel is positioned so that the studs 27 project into the apertures in the bosses 34 on the wheel. The lock nut 36 is then applied and when it is turned by the wrench the conical surfaces on the inside of the wheel hub 11 are caused to ride or move inwardly upon the complemental surfaces 30 and 31 of the inner or permanent hub to insure that the wheel is firmly mounted or seated on the inner hub, the studs 27 and bosses 34 being the driving connections between the wheel and the inner hub. When the dust cap 42 is applied with a wrench the inner vertical surface of the annular portion 43, connecting or intermediate the octagonal head and the cylindrical portion of the cap, engages the outer end of the lock pin 38 thereby forcing the inner end of the lock pin, in opposition to its spring 40, into an engagement with one of the notches 37 on the permanent hub to lock positively the nut 36 in its tightened position on the permanent hub. When it is desired to remove the wheel the cap nut is first removed, whereupon the spring 40 moves the locking pin out of locking engagement to permit removal of the lock nut 36 and wheel. The principal advantages of the above construction in which the forged wheel, consisting of an outer wheel hub, spokes and a tire rim, is adapted to be mounted either on a rear or front inner or permanent hub, are that wheels so constructed may be readily used on different makes of automobiles and that a separate or spare wheel may be carried on the body of the automobile to replace a wheel on either the front or rear axle in a minimum period of time and with great ease, the necessity or expediency of carrying two spare wheels being avoided by making the wheel so that it may be quickly and easily mounted on a permanent hub either on a front or a rear axle.

In the modification, shown in Figs. 8 and 9, I have disclosed a front wheel in which the permanent hub 46 is integral with the center body portion 10, it being understood that this wheel is not adapted to be demountably carried on an inner hub, as is the wheel described above. The center body 10 is not provided with the driving bosses 24 but it is equipped with an annular flange 47, corresponding to the annular flange 14 of the above described interchangeable wheel. The spokes and rim of the wheel, shown in Figs. 8 and 9, are substantially the same in construction and design as those of the wheel heretofore described and therefore the same reference numerals have been applied to refer to corresponding parts. It will be observed in the modification shown in Figs. 8 and 9 that the rim is provided with the permanent flange 15 and the detachable flange 19, the rim being adapted to receive and carry the tire mounted directly thereon. I have not illustrated in the drawings a rear wheel having an integral hub adapted to be secured directly on the rear axle but it will be obvious that the rear wheel would be similar to the front wheel shown in Figs. 8 and 9, except that the hub would be similar to the inner hub 24 shown in Fig. 2 and a brake drum would be mounted thereon.

A drop forged wheel with the tire rim integrally mounted on the ends of the spokes, as above described, possesses many distinct advantages over other types of automobile wheels, having a detachable rim demountably supported on a felloe by means of the usual retaining bolts and lugs. The rim being integral with the spokes, the weight and cost of the separate rim and retaining bolts are eliminated and the reduction in the number of parts lends simplicity of design and structure to the wheel and ease of application of the tire thereto. The objectionable noise, due to friction between the usual demountable rim, felloe and retaining bolts, is avoided and perfect alignment of the tire on the wheel is assured, there being no adjustable devices which are subject to working loose nor any possibility of the rim warping or being distorted by severe stresses or strains. At the same time the forged wheel may be made approximately as light in weight as wood wheels but with better distribution of weight and with considerably greater strength.

While I have herein described in some detail the particular embodiment of my invention, for the purpose of full disclosure it will be understood by those skilled in the art that many changes in detail might be made without departure from the spirit or scope of my invention hereinafter claimed.

I claim:

1. In an automobile wheel, the combination of an integral forged steel structure comprising a center-body, a rim tapered on its inner periphery and having an integral flange on one side of its outer periphery and a semi-tubular groove in the other side of its periphery; and spokes united at their roots to the center-body and at their outer ends to the rim; and a detachable flange adapted to be seated in said groove to retain the tire on the rim between said detachable and integral flanges.

2. In an automobile wheel, the combination of an integral forged structure comprising a center-body, spokes and a rim positioned centrally on the ends of the spokes, the rim to one side of the spokes being tapered and provided with an integral outwardly extending flange and provided to the other side of the spokes with an integral inwardly extending flange having a groove; and a detachable flange adapted to be seated in said groove to retain the tire on the rim between the outwardly extending integral and detachable flanges.

3. In an automobile wheel, the combination of an integral forged structure comprising a center-body, spokes and a rim positioned centrally on the ends of the spokes, the rim being tapered in opposite directions from its approximate center longitudinal line and provided with an integral outwardly extending flange on one side and an integrally inwardly extending flange having a groove on the other side; and a detachable flange adapted to be seated in said groove to retain the tire on the rim between the outwardly extending integral and detachable flanges.

4. In an automobile wheel, the combination of an integral forged steel structure comprising a center-body, spokes united at their roots to said center-body, and a tire rim integrally united to the outer ends of the spokes, tapered on its inner periphery, and provided on one side of its outer periphery with a flange and at the other side with means, and locking means accommodated by said first-mentioned means for retaining the tire on said rim between said flange and locking means.

CHAS. E. WADE.